Patented Jan. 12, 1937

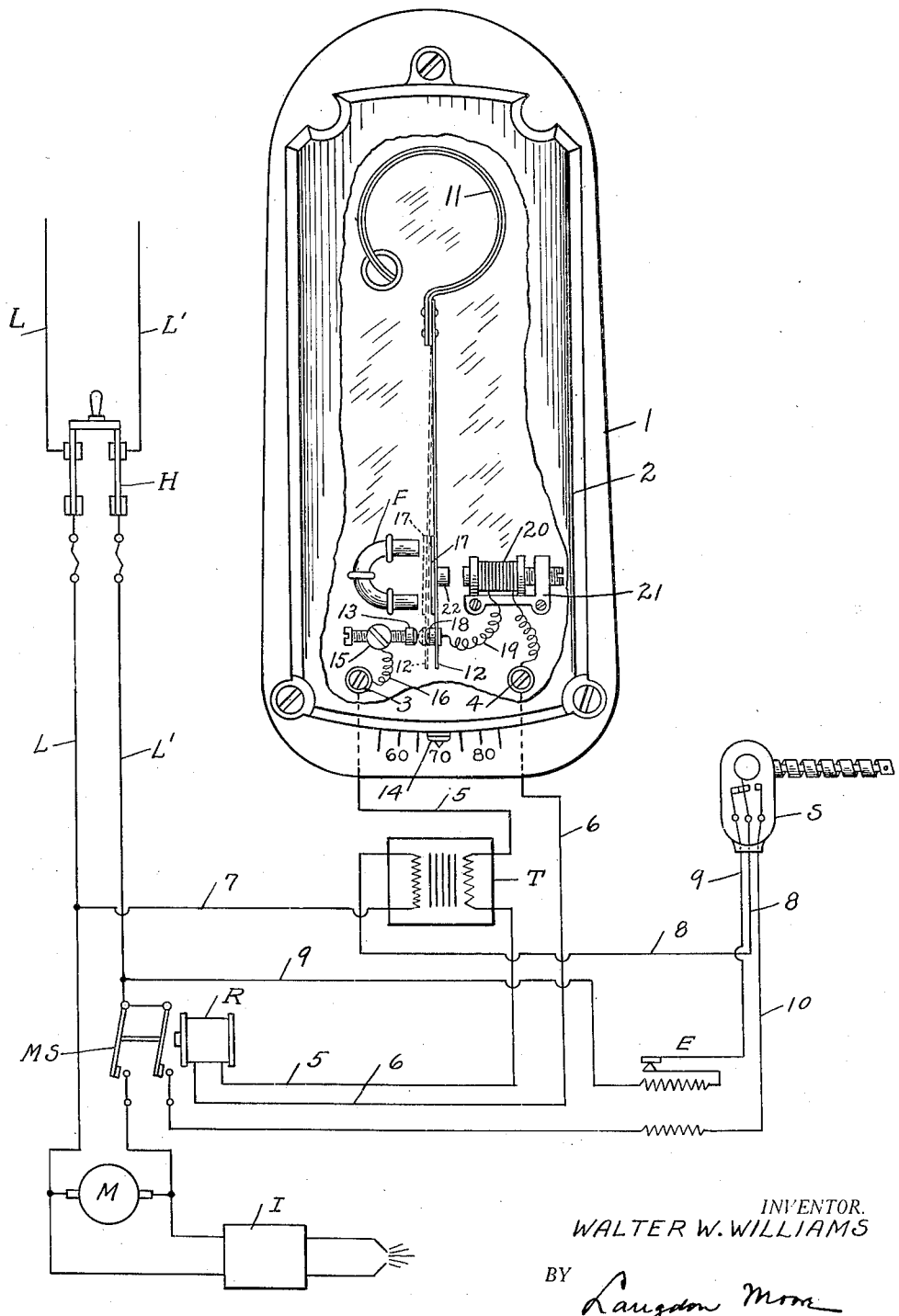

2,067,745

UNITED STATES PATENT OFFICE 2,067,745

ROOM THERMOSTAT

Walter W. Williams, Bloomington, Ill.

Application May 12, 1934, Serial No. 725,247

3 Claims. (Cl. 200—138)

This invention relates to improvements in electric switches and more particularly to a temperature responsive electric switch known to the trade as a thermostat.

Switches of this type have been employed for many years as a part of the control system of electrically operated and controlled fluid fuel burners. A room thermostat is placed in the room or portion of the building where it is desired to maintain an even temperature and is so constructed as to respond upon a decrease below a predetermined temperature to close the control circuit to initiate the operation of the heating system, and upon an increase in temperature above the predetermined degree to break the circuit so that the heating system ceases operation.

In thermostatic switches of this character, various devices have been employed to increase the sensitiveness of operation and particularly to close the circuit promptly upon a slight decrease in temperature. It is just as important for the thermostat to operate in the opposite direction; that is, to break the circuit promptly upon a slight increase in temperature, and it is an object of this invention to provide such a means.

With these and other objects in view, reference is made to the accompanying sheet of drawing, which illustrates a preferred form of this invention, with the understanding that minor changes may be made without departing from the scope thereof.

The figure upon the drawing illustrates a preferred embodiment of this invention in front elevation, with a part of the casing broken away, and illustrating by a wiring diagram the application of this improved thermostat in the control system of a fluid fuel burner for domestic heating purposes.

The switching mechanism of the thermostat is mounted upon a base 1, preferably of Bakelite, and is preferably protected by a cover 2 detachably secured to said base. In this embodiment of the invention the thermostat is positioned wherever desired within the building to be heated and is connected through binding posts 3 and 4 upon the base 1 in the control circuit of the heating mechanism.

The heating mechanism in this instance is a commercial fluid fuel burner, including a motor M for operating the burner mechanism connected in circuit through the hand switch H to the commercial source of electricity by the leads L and L'. A stepdown transformer T is provided in the control system. The improved thermostat is connected in series with the secondary coil of the transformer T by the wires 5 and 6, with a relay R connected in series in the wire 6 between the binding post 4 and the secondary coil of the transformer. The primary coil of the transformer is connected by the wire 7 to the commercial line L and by wire 8 to a commercial form of stack switch S responsive to the presence and absence of combustion within the heater. In the cold position, the stack switch completes the circuit from the primary coil of the transformer through wire 9 and electro-thermal switch E to the return line L'. The impedance of the transformer T prevents the passage of the commercial current through the circuit above described as long as the secondary circuit is broken through the room thermostat. The closing of the room thermostat energizes the relay R which closes a normally open switch MS in the motor circuit to supply fluid fuel to the burner mechanism, and operation of the heating device is initiated and the fuel ignited, as by the electric ignition device I connected in the motor circuit. The stack switch S responding to the heat so generated breaks the circuit through the wires 8 and 9 and closes a circuit from wire 8 through wire 10 and motor switch MS to the return commercial line L'. When the desired temperature is produced by the heating device, the room thermostat opens the secondary circuit and the operation of the heating mechanism ceases.

The room thermostat includes a thermostatic metal or bi-metallic element 11 with one end mounted upon the base 1 and the free end 12 extended to move into and out of engagement with an adjustable contact 13 in response to decrease and increase in temperature of the surrounding air. The thermostatic element 11 is adjustably mounted upon the base 1 and is calibrated to be adjusted by the pointer 14 depending from the under side of the casing in connection with a scale displayed on the base below the casing to cause the free end 12 to engage the contact 13 at the desired degree of temperature. This construction is common in devices of this character and as it forms no part of this invention it is not thought necessary to describe the same in detail.

The contact 13 is preferably adjustably mounted in the post 15 mounted upon the base 1 and is connected by the wire 16 to binding post 3. A fixed magnet F is supported upon the base adjacent the contact 13, and the free end 12 of the thermostatic element is provided with an armature plate 17 adapted to coact with the fixed magnet F as soon as the end 12 of the thermostatic element, in response to a temperature change, moves the armature 17 into the field of the fixed magnet. The free end 12 is provided with an electrical contact 18 connected by the wire 19 to the binding post 4. The contact 18 is so positioned on the free end 12 of the thermostatic member to coact with the contact 13 so that the pull of the fixed magnet snaps these contacts into engagement to complete the circuit to start the oil burner mechanism, which will continue to produce heat until the heat of the air surrounding the room thermostat causes the arm 12 to move away from the contact 13 to break the circuit to the burner mechanism.

Inasmuch as the fixed magnet F has assisted and quickened the time of normal movement of the arm 12 to close the contact in response to a decrease in temperature, it will, therefore, consume more than normal time in separating the contacts 13 and 18 as the attraction of the magnet F must be overcome. To assist the normal movement of the thermostatic element 11 in overcoming the pull of the fixed magnet F, separating the contacts 13 and 18, an electro-magnet 20 with its windings connected in series between the contact 18 and the binding post 4 through the wire 19 is adjustably mounted in a bracket 21 upon the base 1, preferably opposite the fixed magnet F, and the adjacent side of the free end 12 of the thermostatic element is provided with an armature 22 coacting with the electro-magnet 20. The electro-magnet 20 is so adjusted that as soon as the circuit is closed between the contacts 13 and 18, the electro-magnet is energized to exert a pull upon its armature 22 to either neutralize the effect of the fixed magnet F upon the arm 12 or to exert a pull thereon insufficient to break the circuit, and will be deenergized when the arm 12 normally moves the contact 18 out of engagement with the contact 13 to break the circuit. As soon as the free end 12 of the thermostatic element is again normally moved in response to temperature changes to enter the field of the fixed magnet F, it will respond thereto, as above stated.

The addition of the electro-magnet connected as disclosed herein produces a closer operating differential and may be so adjusted that a decrease of two degrees in temperature will close the circuit and an increase of one-half degree will open the circuit.

The effect of mounting the armature carrying arm 12 of the thermostatic member 11 to reciprocate between two magnets is to produce a snap movement to make and break the circuit controlled thereby, made possible by one of the magnets being energized by the closing of the circuit.

I claim:

1. A thermostatic electric switch having a fixed contact connected to a binding post, a movable contact connected to a binding post and mounted upon an arm of a thermostatic member responsive to temperature changes to reciprocate said movable contact to engage and disengage the fixed contact to make and break the circuit between the binding posts, a fixed magnet adjacent the fixed contact, an armature therefor upon the movable contact carrying arm whereby as soon as the thermostatic member moves the armature to enter the field of the fixed magnet the contacts are closed with a snap, an electro-magnet connected in series between the movable contact and its binding post arranged on the other side of the movable contact carrying arm, an armature therefor upon the contact carrying arm, said magnet so arranged that upon the engagement of the contacts the energization of the electro-magnet will exert a pull upon its armature to neutralize the pull of the fixed magnet.

2. The structure of claim 1 wherein the electro-magnet is so adjusted that the normal movement of the contact carrying arm in separating the armature from the fixed magnet will carry said armature out of the field of the fixed magnet before the electro-magnet is de-energized by the separation of the contacts.

3. A thermostatic switch having a fixed contact, a movable contact carried on the free end of a thermostatic member responsive to changes in temperature to engage and disengage said contacts, constantly energized magnetic means adapted to accelerate the normal rate of movement of the thermostatic member in response to a temperature change to engage said contacts with a snap, and normally deenergized magnetic means adapted to be energized upon the engagement of said contacts to neutralize the pull of the first magnetic means and allow a normal rate of movement of the thermostatic member initiated by a change in temperature to disengage said contacts.

WALTER W. WILLIAMS.